Figure 1:
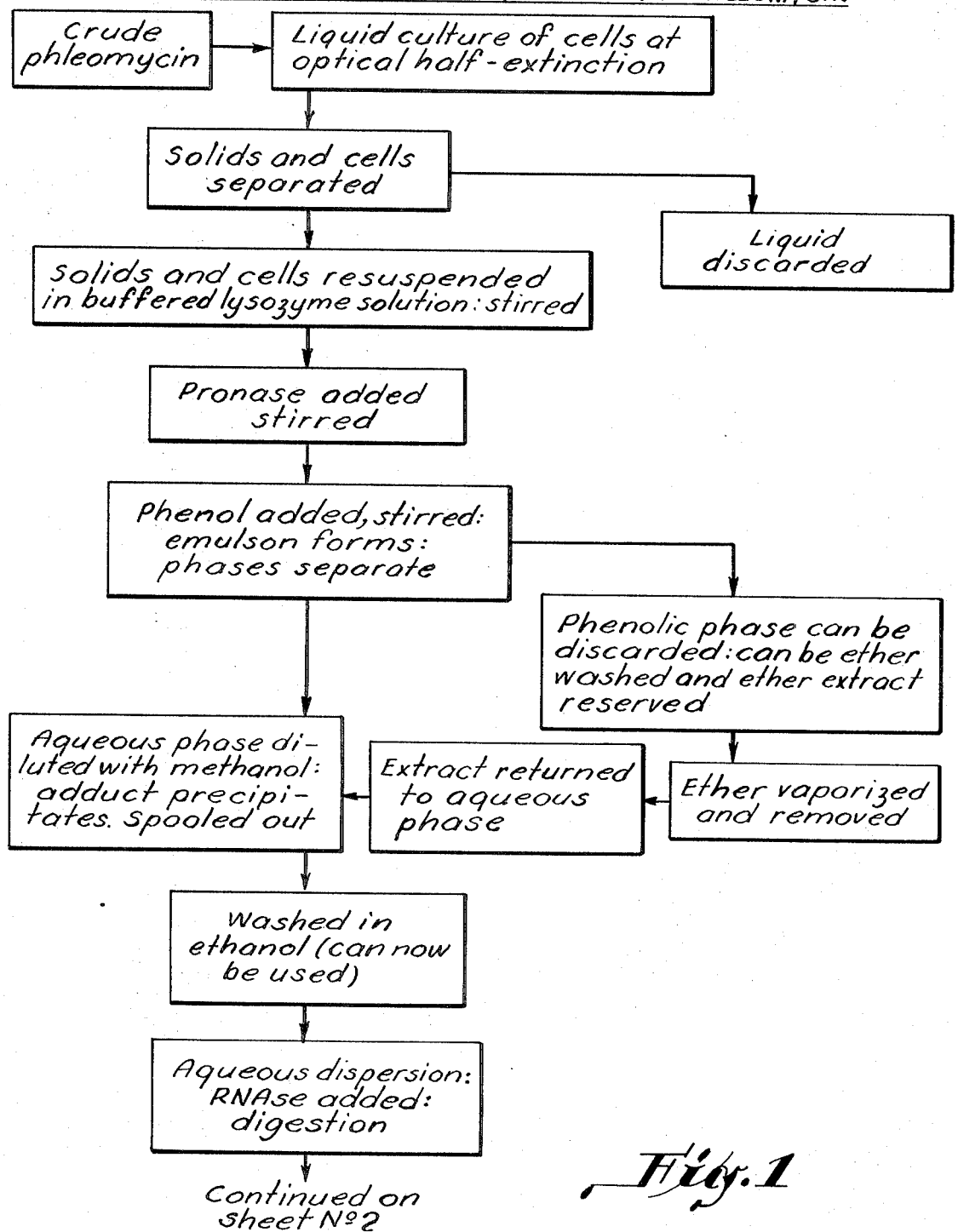
Figure 2:
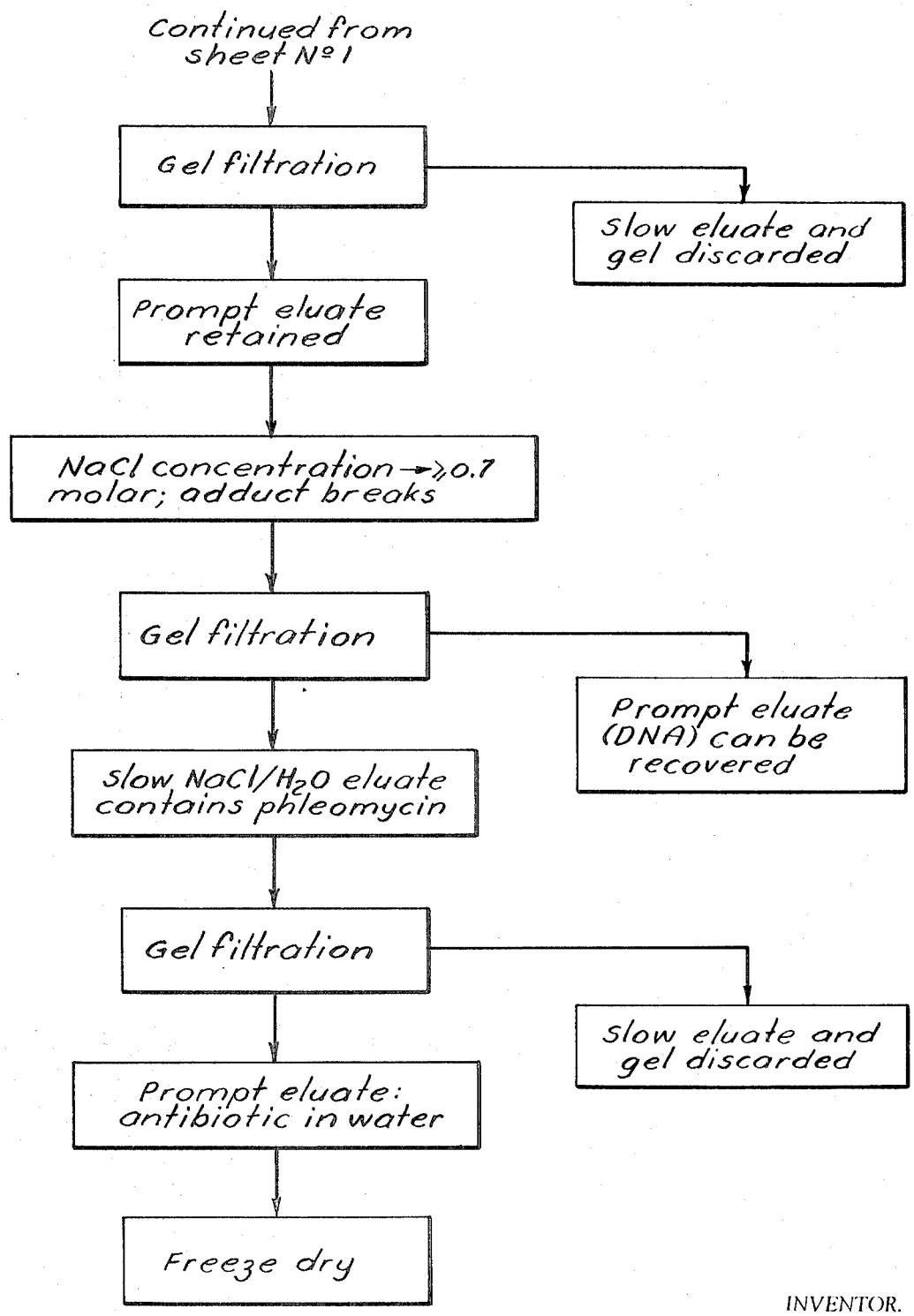

United States Patent

[11] 3,616,211

| [72] | Inventor | Paul A. Pietsch |
| | | Midland, Mich. |
| [21] | Appl. No. | 725,980 |
| [22] | Filed | May 2, 1968 |
| [45] | Patented | Oct. 26, 1971 |
| [73] | Assignee | The Dow Chemical Company |
| | | Midland, Mich. |

[54] PROCESS FOR PRODUCING DEOXYRIBONUCLEIC ACID
1 Claim, 2 Drawing Figs.
[52] U.S. Cl. .................................................. 195/28 N, 424/116, 424/123
[51] Int. Cl. ................................................. C12d 13/06
[50] Field of Search .......................................... 195/28 N

[56] References Cited
OTHER REFERENCES

Davidson et al., Progress in Nucleic Acid Research and Molecular Biology, Vol. 3 Pages 5, 6 and 193 (1964).

Kawamata et al., Nature, Vol. 187 Pages 1112 and 1113 (1960).

*Primary Examiner*—Alvin E. Tanenholtz
*Attorneys*—Griswold and Burdick and Albin R. Lindstrom ABSTRACT: An antibiotic characterized by the property that it bonds with deoxyribonucleic acid to form an adduct, and represented by phleomycin, is purified by combining the crude material with deoxyribonucleic acid, alone or as nucleohistone in vitro or especially in vivo, to form its specific complex, removing objectionable impurities that do not form such complexes, optionally liberating the antibiotic from the deoxyribonucleic acid complex as by enzymolysis, and separating it from the enzymolyzed fragments.

PROCESS FOR PRODUCING DEOXYRIBONUCLEIC ACID

BACKGROUND OF THE INVENTION

1. Field of the Invention

Many antibiotics are produced in an impure state and require purification before they can be used successfully. The instant invention presents a process of purification that is adapted to be used to purify any antibiotic which forms an adduct with deoxyribonucleic acid; but for convenience will discuss primarily the antibiotic phleomycin.

In the culture of *Streptomyces verticillus* not only the antibiotic phleomycin but toxic impurities largely unidentified are produced. For controlled use, phleomycin requires purification. Attempts to purify the antibiotic hitherto have been of limited success and the purified material has been unsatisfactory.

A discussion of the antibiotic and its production appears in numerous references, including "Antibiotics; Origin, Nature, and Properties" by Korzybski et al., English translation published by Pergamon Press, Oxford, etc., 1967. See Vol. 1, page 435 ff. However, the attribution, there, of the antibiotic to production from the culture of *Streptomyces verticillatus* appears to be in error. *S. verticillatus* is the source, rather, of porfiromycin, see U.S. Pat. No. 3,219,530. On obvious physical properties and on infrared spectrum, the antibiotics differ.

Specific antibiotic activity of phleomycin in pure form is not clearly reported in the literature, but usable dosages appear to be of the general order of magnitude of a moderate number of micrograms per kilogram body weight of dosed subject. Thus, in the present state of the published art, purification of the material is of practical interest in less-than-gram amounts of pure product.

2. Prior Art

While chemical purification techniques generally are well known, present applicant knows of no good prior method of purifying phleomycin, and believes that the instant method is broadly new. Indeed, very little is believed to have been known that would point to the fact that the antibiotic as produced is impure.

The antibiotic is described, 9A *Journal of antibiotics* (Japan) 82 (1956) by Maeda, Kosaka, Yagishita and Umezawa who first prepared it. The toxicity, imputed largely to impurities, by reason of which its effective development has been hindered, is mentioned, XV *Journal of Antibiotics Series A.*, 274 (1962) by Umezawa et al. Both these articles present useful bibliographies. The value of phleomycin as an antibacterial agent is reported in the same journal, July, 1963, page 172. The articles mentioned in this paragraph, including their bibliographies, are all here incorporated by reference.

DESCRIPTION OF THE PRESENT INVENTION

Optionally but advantageously, the present invention makes use of the technique, among others, believed to have become practical for the first time in 1959, known as gel filtration. The technique is now well known. Those not familiar with it are referred to the numerous publications in which it is discussed. Representative articles include the following, which are here incorporated, in their entirety, by reference:

Flodin, P., Dissertation, Uppsala 1962, 85 pp. "Dextran gels and their applications in gel filtration."

Gelotte, B.; *J. Chromatog.* 3 (1960) pp. 330-342. "Studies on gel filtration sorption properties of the bed material 'Sephadex' by"

Porath, J., Flodin, P., *Nature* 183 (1959) pp. 1657-1659. "Gel filtration: A method for desalting and group separation."

Flodin, P., Gelotte, B., Porath, J., *Nature* 188 (1960) pp. 493-494. "A method for concentrating solutes of high molecular weight."

Chemists otherwise skilled but not familiar with gel filtration will be enabled, by the teachings in these articles, to make use of the technique in the relatively simple aspects here employed.

The accompanying flow chart represents the embodiment of the process of the present invention *in vivo*, the most highly developed aspect of the invention. It is purely illustrative, and the invention is to be understood as defined in the specification and claims.

For present purposes, a 200-milligram sample of phleomycin is considered an approximately standard quantity for purification in facilities of laboratory and small pilot plant size, although larger or smaller quantities are readily handled by scaling the present procedures accordingly. For purposes of this invention, the best phleomycin output now available is considered to be crude, or impure, phleomycin.

The impure product is first dissolved in water to obtain a relatively dilute solution: 200 milligrams are successfully dissolved in a liter of water. The resulting solution is of a blue color and it has typically contained sodium chloride and various inorganic copper compounds among its impurities.

In connection with the present invention, careful studies have been made of the composition of crude phleomycin and of the product treated according to the present invention. The crude product has been shown by mass spectrometry to present strong evidence of chemical entities, containing sulfur in tetravalent or hexavalent form, that appear to be residues from the breakdown of such mucopolysaccharides as are characteristic of the cell walls of various fungi. Such materials, not known hitherto to have been associated with phleomycin, are notorious as causing kidney damage. The literature imputes kidney damage to phleomycin. While not believed to have been reported, the presence of such fragments seems plausible because of the fungal origin of the substance.

The aqueous solution, prepared as directed, is held at a controlled pH. A preferred pH is between 6 and 9, and preferably about 7. If desired for later reference, photometric readings of the transmission of, e.g., visible light or any of its components, through the impure starting aqueous solution, are taken at this juncture. They can be substantially monochromatic readings through any of a variety of filters, or they can define transmission and color (i.e. wavelength) as coordinate values, defining an area.

The solution is then desalted, and gel filtration is the method of choice. A highly cross-linked, substantially nonionic dextran, "Sephadex G 10" is the material of choice, although other filtration gels can be used. The dextran material, supplied as apparently dry small beads is dispersed in water, in which the beads swell and loosely coalesce. The solution of impure antibiotic mixture is then passed, by gravity or with centrifugation or suction or the like, through the gel, and sodium chloride and inorganic cupric salt fractions are detained in the gel and subsequently discarded. When using Sephadex G 10 cross-linked dextran, the antibiotic, which is of molecular weight above 1,000, tends to pass through unhindered, while the salts or, more exactly, their ionic species, tend to be detained on the filtration gel.

From this juncture forward, the present method optionally follows either of two courses, *in vitro* or *in vivo*. The former is faster, the latter can be used to obtain products of superior purity.

An *in vitro* technique is described first because a familiarity with it tends to establish the rationale of the *in vivo* method, the chemical course of which is very similar.

IN VITRO PURIFICATION

In the description that follows, without subsequent mention, all techniques are assumed to be sterile techniques, all manipulations are assumed to be carried out with elegance and with strict, quantitative accuracy; all equipment is assumed to be of sizes, materials, and qualities best adapted to the work in hand, and scrupulously clean; all employed substances are assumed to be of the highest purity. It may be pointed out that the procedures that follow will yield efficient results only at the hands of a chemist with bench skills of the highest order. However, nothing impractical or impossible is required of such a worker.

Shredded, dry, commercial deoxyribonucleic acid from calf thymus is dispersed in water, and therein is stirred for a period of time such as overnight, to obtain an aqueous dispersion of deoxyribonucleic acid. Illustrative of the manipulative demands mentioned, it is assumed that a chemist qualified to practice the present invention efficiently would know, without special mention, that the deoxyribonucleic acid is managed under aseptic conditions, that the equipment is sterile; that the water is sterile, glass-double-distilled water stored, following distillation, in airtight containers of glass chosen for low aqueous solubility; it is aseptically dispersed with minimum air contact; stirring is effected by aseptic means under airtight and micro-organism tight cover with regard to prevent, for example, leakage of lubricants from glands in cover glasses, into the solution; and, depending upon the immediate situation, that other such refinements and elegances of procedure will, without further mention, be scrupulously observed.

To the resulting dispersion is added such portion of the antibiotic-containing eluent from the above-described desalting step as will supply 1 or less weight parts of antibiotic (purified basis) per 2 or more weight parts of deoxyribonucleic acid, dry weight basis. The antibiotic-containing material is stirred into the nucleic acid dispersion thoroughly and over a period of time, to allow a reaction to occur. See 208 Nature No. 5016, pp. 1170-1173, (Dec. 18, 1965 ) by Pietsch and McCollister.

During stirring, the highly active, highly specific proteolytic enzyme, Pronase, is added, in small, catalytic amounts, such as 0.5 percent by weight of assumed pure weight of antibiotic. The activity and identification of the enzyme Pronase has been reported by Kesner et al., Biochim. Biophys. Acta. 85 (1964 ) pp. 435-440, which article references earlier work by Nomoto, Narahashi and Murakami, J. Biochem., 48 (1960 ) p. 593, on this same material.

The enzyme "digests," i.e. reduces the size and mass of molecular units by lysis, of any proteinaceous matter present, while the desired antibiotic becomes bound to the very large deoxyribonucleic acid molecules. A short time, such as 15-30 minutes mixing at room temperature, carries this step to its practical completion.

The large molecular species, with the antibiotic bound to them, are now to be separated from the small ones. If this separation is to be accomplished by gel filtration as heretofore, notice should be taken of the viscosity of the dispersion to be separated; and, if necessary, it is diluted to a viscosity low enough that gel filtration becomes feasible. In general, viscosity of a dispersion to be separated by gel filtration should be below about 5 centipoises. Such dilution may involve dilution to relatively large fluid volumes. In the present situation, while gel filtration can be used, dialysis has been the method of choice to separate and retain the large molecules containing bound antibiotic, from the smaller ones that are to be discarded. Standard dialysis equipment and methods are used. The dialysis is continued to substantial exhaustion, all material passing the dialytic membrane being discarded.

When it is desired, as it may often be desired, to exhibit the antibiotic in the form of its addition product with deoxyribonucleic acid, the product is at this juncture regarded as a standard. It is bioassayed in known techniques, and, if desired, photometric readings are taken. It is useful, in the present condition, for many of the various applications for which the antibiotic is adapted.

When it is desired to separate the adduct of deoxyribonucleic acid and antibiotic from its aqueous menstruum, further relatively concentrated aqueous deoxyribonucleic acid is added to the complex dispersion, whereupon the complex and excess nucleic acid material form as strands and shreds settling from the fluid dispersion; they are caught and loosely spooled, as on a stirring rod, fork, or the like.

The spooled material is then washed with water, with dilute (perhaps 50 percent) aqueous ethanol, with ethanol-water constant-boiling mixture and, ultimately, with absolute ethanol. Ethanol is then gently evaporated from the product under desiccative conditions, and product placed in protected storage. Such storage, although not always convenient, is afforded by protected immersion in absolute ethanol. The purified antibiotic exists in the usable form of its complex with deoxyribonucleic acid.

When it is desired to separate the essentially undiluted and purified antibiotic from the deoxyribonucleic acid, the solubility of the material in aqueous alkali metal salt solutions is employed. The complex of antibiotic and deoxyribonucleic acid is dispersed, and it dissolves, in a normal aqueous solution of sodium chloride or potassium chloride. To the resulting solution is added further salt to a saturation concentration and thereby the deoxyribonucleic acid is denatured, freeing the antibiotic. The denatured nucleic acid material is separated by paper or like filtration and the antibiotic passes through in the filtrate. This filtrate is again desalted through gel filtration, by means of which, also, the antibiotic concentration in water is also readily increased.

It may be preferred to reserve the antibiotic at any stage including the final and most nearly completely purified stage, as a water solution. Assuming the use of sterile and similarly careful techniques as hereinbefore specified and as commonly employed in the pharmaceutical industry, the water solution is a satisfactory terminal form of the material. It can, of course, be a physiologic saline water if desired, so long as aqueous content is maintained in proportion.

When it is desired to derive the actual antibiotic in waterfree form, the complex is denatured in molar aqueous sodium chloride, desalted, and separated from deoxyribonucleic acid as hereinbefore described Then, water is removed in either of two ways. Freeze-drying in small-batch vacuum methods gives good results. Alternatively, the water solution is diluted with a liquid that is miscible with water in all proportions, not injurious to, but not a solvent for, the antibiotic. Acetone is such a material, as are various other oxygen-containing small organic molecules. As such solvent is added to the antibiotic solution with the result that the proportional water content declines, the antibiotic precipitates and is removed in known techniques such as filtration or centrifugation and decanting, and the resulting wet, powdery solid evaporated to dryness of water and solvent under desiccating conditions. With such drying the process of in vitro purification with deoxyribonucleic acid, according to this invention, is complete.

PURIFICATION IN VITRO WITH DNA-PROTEIN COMPLEX

In its natural circumstance, deoxyribonucleic acid occurs, and is possible to extract, as nucleohistone, a delicate, natural partial complex of the deoxyribonucleic acid with a protein sheath covering the major helical groove of the macromolecule. In the present embodiment of this invention, using known procedures, the nucleohistone is extracted in saline waters from ground tissues. A highly purified form of this substance is then used in manner similar to the foregoing to purify the antibiotic.

In more detail, in the example given herein, the nucleohistone was extracted as the deoxyribonucleic acid-protein partial complex by the method of Zubay and Doty (Journal of Molecular Biology Vol. 1, p. 1, 1959 ). Calf thymus, fresh or frozen, provides a very suitable starting material and was here used. Experience has shown that the fresher the tissue the greater the extent of integrity of the complex of protein and deoxyribonucleic acid. Ideally, the weight ratio between protein and deoxyribonucleic acid in nucleohistone should be close to 1.0. In practice a value between 0.85 and 1.25 has been found acceptable for the purposes discussed herein. As the association of protein with deoxyribonucleic acid weakens, the desirable features of the method are lost. Therefore, prior to the use of a given batch of nucleoprotein it is desirable to analyze, in known procedures, for the relative concentrations of protein and deoxyribonucleic acid.

The present procedures were scaled down to laboratory proportions but are easily scaled up a few orders of magnitude for production purposes. The principle in the procedure is founded on the fact that nucleoprotein is slightly water soluble. Working at 4° C. with all the elegance of materials, equipment, and procedure hereinbefore discussed, a 30-gram portion of calf thymus frozen solid at the slaughter house was blended in a Waring blender in 200 milliliters of a solution which contained (in the same solution) 0.075 molar sodium chloride, and 0.024 molar disodium salt of ethylenediaminetetraacetic acid, with 1 milliliter of caprylic alcohol. The pH was 8.0. The blender was equipped with a motor built for normal operation at 120 volts but here employed with a variable power supply, the use of which helps to standardize procedures. Tissues were homogenized for 1 minute with the blender motor operating at 80 volts, and for 4 minutes at 50 volts. Homogenate then was centrifuged for 10 minutes at 2,000 revolutions per minute. The supernatant fluid was discarded and the sediment was rehomogenized in 200 milliliters of the above-mentioned solution, 5 seconds at 80 volts and 30 seconds at 45 volts. Centrifugation was repeated, supernatant fluid again collected and the procedure repeated six more times, for a total of eight times. The final sediment was blended for 5 seconds in 50 milliliters of water and then 950 milliliters water was added and the mixture again was blended for 10 seconds with the power source set at 60 volts. The mixture was immediately transferred to a 2-liter beaker and stirred. The stirring device comprised a semicircular paddle covered with polytetrafluoroethylene designed specifically for use in a 2-liter beaker. Initially the sample was highly viscous and cloudy. The rate at which the paddle rotated was altered constantly during the first hour. Frequent adjustment was necessary because of changes in viscosity, with the objective being to stir the liquid firmly but without creating splashes or bubbles. Rotation of the paddle was between 30 and 100 revolutions per minute. About 4 hours of stirring were required to produce a clear solution. Beyond 5 hours with a given sample if a completely clear solution has not yet formed it is unlikely that this state will ever be achieved by stirring. Any persisting lack of clarity usually results from denatured insoluble proteins present in the solution, unassociated with the nucleoprotein complex. Such a sample can be cleared by gentle centrifugation. In the present example this was unnecessary and when clarity was achieved the clear solution was divided into 250-ml. aliquots for convenience, and transferred to cellophane dialysis tubing. Samples were dialyzed overnight (approximately 12 hours) against 1,800 milliliters of 0.7-millimolar sodium phosphate buffer at a pH of 6.8 . The dialysis buffer was changed once during the interval specified. In the present example there was a homogeneous gel in the solution at the end of dialysis; this was broken by centrifugation at 70,000 g. for three minutes at 2° C. The supernatant, which contained the nucleohistone, was a crystal-clear, highly viscous watery material. To an aliquot of the supernatant, sodium chloride solution was added to bring the solution to a molar concentration of sodium chloride; thereto, 95 percent ethanol was added, and immediately upon the addition of 95 percent ethanol to this solution there occurred a precipitation of transparent, soft, solid fibers of nucleohistone closely resembling the fibers of alcohol-precipitated deoxyribonucleic acid. The formation of such precipitate at this juncture can be regarded as a preliminary quality check; if no such precipitate appears, the sample may be discarded and the work repeated, beginning at some appropriate earlier point.

In a second aliquot the concentration of deoxyribonucleic acid, most of it bound in nucleohistone, was determined in the first instance by ultraviolet spectroscopy and in the second instance by hydrolysis in molar perchloric acid followed by the Burton diphenylamine reaction test.

The Folin-Ciocalteau reaction was employed to estimate protein content. The ratio of protein to deoxyribonucleic acid in the present example was 0.89.

Aqueous solutions of crude phleomycin were added to aliquots of the above-mentioned aqueous nucleoprotein samples to form the specific complex of the antibiotic with deoxyribonucleic acid here in the form of nucleohistone; and the resulting materials were passed through gel filtration (with Sephadex) and treated in essentially the same manner as in the previously described in vitro purification procedure involving the complex of phleomycin with deoxyribonucleic acid alone; more particularly, the complex was passed through a prepared column of G-25 Sephadex and the prompt eluate was retrieved. This prompt eluate was the complex of nucleohistone and phleomycin, and was then in condition for such antibiotic uses as can be accomplished with the complex. Tardy eluates and retained material are discarded.

In another procedure, the aqueous nucleohistone-phleomycin complex solution is separated by known centrifuge density gradient techniques, conveniently employing a water solution of cesium chloride (CsCl). Samples of cesium chloride of the highest available purity have been found to give nonuniform results in this procedure. It is suggested that range-finding tests be conducted. A concentration that is 1.87 molar of CsCl in water has given best results for the present inventor. Centrifugation at $7.8 \times 10^5$ degrees of rotation per hour for 20 hours has been adequate. The density gradient region to be retained can be identified photometrically, relying upon standards derived in photometric measurements carried out earlier upon impure material or upon previous purified samples.

The cesium chloride sedimentation gradient technique is described, generally, in "Equilibrium Sedimentation of Macromolecules and Viruses in a Density Gradient" by Vinograd and Hearst, in "Fortschritte der Chemie Organischer Naturstoffe" (Springer Verlag, Wien,) 1962, edited by Zechmeister, pp. 372–422 and the references there footnoted, all of which are here particularly incorporated by this reference.

However, refinements in the procedure and in the equipment are useful in the purification of phleomycin. A Becton-Dickinson refrigerated international centrifuge with swinging bucket rotor head has been used with good results, as sample temperatures have been held in the range of 1°-3° C. throughout not only centrifugation but also subsequent processing. Polycarbonate sample tubes have been used. In separating the desired density gradient, after centrifugation, the tubes have been bottom-pierced with a tube piercer produced by Measuring and Scientific Equipment; and the contents flushed upwards with aqueous CsCl flush that is isotonic with the employed solution and introduced at the rate of 1 milliliter per minute and with minimal turbulence through a continuous flow cell on a spectrophotometer set to measure absorption at 257 microns.

The procedure is adapted both to sample assay an to small-scale production separations. Sample assay requires only that the spectrophotometric reading be interpreted in light of the sample history. For production purposes, the portion of the density gradient spectrum representing the desired absorption and therefore the desired product concentration can be removed and further treated notably by removal of cesium chloride.

The density gradient spectrum, as assayed spectrophotometrically, with a sample prepared in the indicated manner, shows a first, or lower-density very well-defined feature of two closely adjacent peaks, representing unmodified nucleohistone. A plateau area represents the density spread of the adduct of nucleohistone and phleomycin, and the density spread represents varying degrees of addition of phleomycin to nucleohistone molecules. Amplitudes of the density inflections vary as a function of concentrations of density-fractionable solutes. A density gradient of a control sample of nucleohistone without phleomycin, manifests the first but not the second inflection and establishes that the former is the nucleohistone alone. The latter is the complex, which can also be regarded as a copolymer, of nucleohistone and phleomycin. This latter is separated for use in recovering the purified antibiotic.

The resulting aqueous antibiotic adduct solution is then again segregated by gel filtration by which salts including cesium chloride are removed, as before. As a result of these procedures, there is obtained an aqueous solution of adduct of nucleohistone with phleomycin antibiotic of purity adequate for experimental and related uses, with results that are, as to the antibiotic, essentially replicable.

To separate nucleohistone from phleomycin, the nucleohistone is first deprived of its protein partial sheath, and this is accomplished by enzymolysis, with Pronase being the enzyme of choice. A small amount, on the order of 10 milligrams per liter of aqueous material, is added and allowed to digest at room temperature for a period of time, for example, 15 minutes. A longer digestion time does no serious harm. The protein is digested, that is to say, divided into smaller fragments. There remains, intact, the adduct of deoxyribonucleic acid derived from the nucleohistone, with attached phleomycin.

To complete the separation of complex adduct from other substances, ethanol is added in increasing amounts until there is achieved an ethanol-water mixture in which the resulting complex is not soluble, whereupon it precipitates in the familiar form of long shreds and strands.

The fibrous precipitate is spooled out and reserved, the liquid discarded. The precipitate is again dissolved in water and is treated with a lysing solution of which the active agent is the enzyme DNAase. Small, catalytic amounts of the enzyme suffice such as 0.01 percent by estimated weight of deoxyribonucleic acid. When the hydrolysis of the deoxyribonucleic acid has gone forward to a satisfactory point, the lysing solution is modified by the addition of pronase. This last enzyme effects the lysis of both DNAase and protein fragments.

Thereafter, a final gel filtration through Sephadex as has been hereinbefore noted, is carried out; the phleomycin, by now quite purified, comes through in the prompt eluate. It is recovered in aqueous solution and, as has been noted earlier, may be held in that form or may be dried to the absolute antibiotic.

In order to show that phleomycin did bind to nucleohistone, an aliquot of the complex was placed on an inoculated agar plate for standard bacteriostatic bioassay. The test was replicated and bacteriostasis was observed.

IN VIVO PURIFICATION

The same assumptions are made here, as previously, as to materials and equipment used, and skill of persons involved.

In the present example a diachronous culture was employed, and such cultures are employed with good results. However, for larger scale production, it may be advantageous to employ a synchronous culture, in which the circadian rhythm of the organisms manifest epoch receptive to the instant antibiotic at the same time, or at times nearly the same. By the use of synchronous cultures it is possible to achieve economies of time in vessel capacity, attendant time, and the like. While bacteria are here illustrative, DNA-producing viruses, or vegetable or animal cells can be used.

In a 5-liter glass flask, in standard brain-heart infusion broth as medium, the exact amount of medium not critical but about 4 liters, a pure culture of *Escherichia coli* is grown to achieve Bausch & Lomb spectrophotometric density relative to a standard optical density (at 550 mu) of about 5 (12 is an asymptotic approach to extinction). *Escherichia coli* is a very satisfactory organism; but other bacteria, or fungi, or cultures of isolated cells of higher organisms can be used.

When the culture attains the indicated optical density, to a close approximation, and as it continues to increase with growth of the organism, the crude phleomycin is added, as a liquid dispersion and well stirred. The culture continues to grow, and such growth is permitted to continue, as long as increase of optical density is observed. This optical density increase, which represents increase of population of the microorganism, persists typically for one complete division cycle as the antibiotic becomes bound. It is noted here that this organism, in common with other organisms, manifests a circadian rhythmic recurrence of an epoch, incident to the replication of deoxyribonucleic acid, during which, briefly, the living deoxyribonucleic acid assumes a posture receptive to the antibiotic and during which, therefore, any binding of antibiotic, as its deoxyribonucleic acid adduct, occurs. Such receptive epoch in any individual cell occurs at least once in the recurrence of each division cycle. Thus the practice of allowing at least a day to pass tends to assure intake of the antibiotic by cells in quantity sufficient to inhibit replication of deoxyribonucleic acid and, correspondingly, to halt further increase in population and, therewith, increase of optical density of the treated culture.

The problem is occasionally encountered that the culture achieves density near enough to extinction that an end point is not readily determined. If need be, the culture sample can be diluted, or its density measured in lesser section, as a growth end point is sought when two or more successive optical density readings are essentially alike.

At the achievement of the said end point the culture is gently centrifuged to separate out the cells of the micro-organism from the liquid medium. Liquid may be decanted and discarded. The cells bind the antibiotic in such quantities as the instant method recovers by purification.

The cells brought down by centrifugation are then resuspended in lysing solution, presently in the amount of 400 milliliters, approximately; the solution containing approximately 20 micrograms of the enzyme lysozyme per milliliter, along with standard tris buffer to maintain a pH of about 6.7.

The resulting mixture is stirred well for about 15 minutes: room temperature is satisfactory. Thereupon, to the resulting mixture is added *Pronase* in the amount of approximately 10 milligrams per liter and the resulting mixture is stirred for 15 minutes further. Then, to the resulting mixture is added an equal volume of saturated (about 90 weight percent) aqueous phenol at room temperature and the mixture stirred 10 to 15 minutes further.

The phenol has a strong precipitating action upon protein substances that are present. During stirring the viscosity of the mixture increases, and it assumes the appearance of a milky emulsion.

The emulsion is centrifuged, and yields an aqueous and a phenolic phase separated, typically, by an opalescent interphase. The aqueous phase, containing the antibiotic adduct, is collected.

The phenolic phase oftentimes contains small amounts of the desired adduct of deoxyribonucleic acid with phleomycin. It may be inefficient to try to recover these amounts, but it is not difficult. To effect such recovery one adds, successively, portions of diethyl ether and shakes or stirs thoroughly. The volume of an ether portion is not critical and about one-half the volume of phenolic phase is a satisfactory volume. The number of portions is not critical but one or two give good results and beyond five further recovery of adduct is negligible. The ether extract portions are combined, ether is vaporized and removed. The resulting product, if any, is combined with the main product derived from the aqueous phase: it can efficiently be added to the aqueous phase.

To the aqueous phase, then, methanol is added to precipitate a product complex, until further methanol elicits no further precipitate: this concentration represents about 60 to 70 percent methanol: the addition of excess methanol at this point is not harmful.

Unbound, crude, phleomycin is soluble, and in particular its impurities are soluble, in methanol. Subsequent to this step, only the active principle of the crude product remains, and it is entirely in bound form.

Phleomycin in bound form is, at this juncture, sufficiently refined that it is feasible to use for assay purposes. A small portion, only, if the entire fibrous adduct of the antibiotic will be employed; that assay is now described, with the note that further steps of purification and other matters will be described subsequently.

Two methods of assay are available and, at the present level of knowledge, it is preferred that an assay be based upon results of both. They are, bioassayed against *Bacillus subtilis*, and the joint use of the known diphenylamine reaction to assay for concentration of deoxyribonucleic acid, and ultraviolet spectrophotometric assay, of the adduct, for comparison. Either can be quantified against the *in vitro* adduct prepared from *in vitro* purified phleomycin.

In carrying out the bioassay, the purified undissolved complex of deoxyribonucleic acid is dissolved in water, filtered through a Millipore filter to remove any foreign bodies including contaminant organisms, and the filtrate then divided into aliquots for assay procedures.

A standard brain-heart infusion broth, at 30° C. is freshly inoculated with an actively growing strain of *B. subtilis*. The aliquot of phleomycin-deoxyribonucleic acid adduct is added to it, or, in the instance of a check, only deoxyribonucleic acid is added, and the product is incubated at the said temperature with constant agitation as by shaking or the like, and monitored constantly or frequently intermittently, during 1,300 minutes following the addition to it of the aliquot of the antibiotic adduct. The amount of phleomycin-deoxyribonucleic acid adduct employed, determined by range-finding tests if necessary, should be chosen so as not to effect a total inhibition of the *B. subtilis*. The use of side-arm monitoring flasks is convenient, as speeding the conduct of the monitoring process and reducing chances for error. Monitoring is conducted to ascertain change in optical density of the culture with elapse of time. Results in the cultures with the antibiotic adduct are compared with results in otherwise identical cultures to which is added only deoxyribonucleic acid in amount equal to the amount of employed adduct.

It will often be desired to have not only a relative assay, but to quantify it in substantially absolute units. For this purpose, in the same assay procedures, as quantifying basis, one employs further portion of culture, as nearly identical as best laboratory procedures permit, with, as additive, the *in vitro* adduct of *in vitro* purified phleomycin in known concentration on deoxyribonucleic acid. For present purposes, the assumption may be made that *in vitro* purified phleomycin (assuming, always, the most scrupulous of procedures etc.) is pure within the limits of experimental error. When the absolute activity of the *in vitro* purified material is shown by assay to be greater than that *in vitro* purified, the reverse assumption may be made, that the *in vivo* material is pure; and the relative purity of the *in vitro* product estimated. Experimental results have been closely replicable and skilled biochemists will experience no great difficulty.

It has sometimes been the practice to compare the results by height above a Cartesian X-axis of optical density curves at some arbtirarily chosen point of duration of time after inoculation, the higher curve, representing the great optical density, being that of the untreated, and the lower curve, representing the lesser optical density, being that of the phleomycin-treated culture. That discipline is useful here for only the roughest approximation of results. For quantitative results, the curves, including those used only for quantifications, should be integrated and the areas under the curves compared. Such treatment of the data is much preferred because, in view of the circadian response of deoxyribonucleic acid *in vivo* to phleomycin, the early portions of the growth response curves are very similar in treated and untreated samples.

It may be noted here that inept laboratory or production procedures, upon which reliance here ought not to be placed, may lose the entire amount of phleomycin in a batch that is being purified. In this event, bioassay quickly discloses the substantial identity of the treated and untreated samples.

The second assay method relies upon the colorimetric diphenylamine reaction, which is well known. Those not familiar with it are directed to "Study of the Conditions and Mechanisms of the Diphenylamine Reaction for the Colorimetric Estimation of Deoxyribonucleic Acid" by K. Burton, 62 Journal of Biochemistry pp. 315–323, 1956, which is here incorporated by reference. From the test results upon the adduct sample a value is ascertained for deoxyribonucleic acid. From this value, a predicted ultraviolet absorption is calculated, assuming the conditions of the spectrophotometer to be used.

The method then requires that a sample be examined for ultraviolet absorption at 257 microns. The observed value in the adduct of phleomycin and deoxyribonucleic acid should be 2 percent greater than that predicted by the Burton diphenylamine test, as noted; the hyperchromicity being ascribable to the bound phleomycin. Again, quantification is approached as described hereinbefore.

Further, if the ultraviolet absorption at 257 microns is not approximately 2 percent greater than predicted from the diphenylamine colorimetric test, one may assume that, on some inadvertence, the phleomycin has been lost, somewhere in the purification process.

Discussion of purification of antibiotic now resumes.

The fibrous, precipitated complex of antibiotic with deoxyribonucleic acid, in the menstruum from which it precipitated, is then spooled on a stirring rod or the like, and collected. It is now washed in flowing ethanol or in several changes of still ethanol.

The instant antibiotic in the condition here achieved has a wide range of antibiotic utilities, including that of ascertaining the circadian rhythmic receptivity of deoxyribonucleic acid to copolymeric molecules, a topic of wide interest. As to that rhythmic phenomenon, reference is made to "Circadian Clocks," (North Holland Publishing Company, Amsterdam, 1965) edited by J. Aschoff: p. 321 and following are of interest; J. Aschoff: entire work is here incorporated by this reference. Note also 208 Nature No. 5016 pp. 1170–1173, Dec. 18, 1965 by Pietsch & McCollister, here also incorporated by reference. In such studies, the product purified by the method of instant invention has the advantage that it is essentially lacking in extraneous toxicity. More particularly, a group of 15 C57BL6 male mice selected for uniformity of age, weight, and apparent condition, when administered 0.1-milligram doses of purified phleomycin intraperitoneally daily for 4 successive days, showed no ill effects as compared with a group of 15 mice of the same strain as nearly identical as practical to which only physiological saline was administered. Both groups were thereafter held and studied; neither showed ill effects 3 months later. Survival was 100 percent. This contrasts with published information of fatal kidney damage from the crude phleomycin.

The product here can also be used at this juncture to ascertain the circadian rhythm which must be followed in some applications of phleomycin for antibiotic activity. A portion of it typically is employed, following published procedures, in conjunction with biopsy culture of a mouse rhabdomyosarcoma, type BW 10139, Jackson Memorial Laboratory, or other biopsy culture if desired.

Further steps in purification and isolation are now described.

While the adduct of phleomycin and deoxyribonucleic acid can be employed as is, it is often desired to separate the uncombined, substantially pure, antibiotic. Any ribonucleic acid or significant fragments of it present are removed. To this end a small, enzymatic amount of the enzyme RNAase is combined with the water dispersion of the adduct, and it is held for digestion at 37° C. The liquid resulting from this digestion is then segregated.

Gel filtration is again employed, as hereinbefore described, preferably employing a polyacrylamide gel, such that lysed fragments of ribonucleic acid are detained and the much larger molecules of adduct of deoxyribonucleic acid with antibiotic are promptly eluted.

The adduct, now substantially freed of ribonucleic acid and its fragments, is in the prompt aqueous eluate and there remains the breaking of the adduct to free the antibiotic. One procedure, not the most preferred, is enzymatic. In it, the eluate is then further digested with DNAase. An 8 to 12 hour digestion at 37° C. suffices. The digested product is then again filtered through a prepared column of cross-linked dextran gel of suitable particle pore size to segregate the antibiotic from the smaller nucleotide digestion products of the deoxyribonucleic acid. For this, Sephadex G-10 is excellent, and the antibiotic is in the prompt eluate.

In the alternative and preferred procedure, the antibiotic is freed from deoxyribonucleic acid by the addition of relatively strong, e.g., two or more molar, solution of sodium chloride or potassium chloride, in amounts sufficient to free the antibiotic from the deoxyribonucleic acid. These components separate when the whole solution reaches about 0.7 molar. This method has the advantage that the resulting highly purified deoxyribonucleic acid can, itself, be retrieved efficiently as a side product; that process is herein described, also.

In carrying out the preferred procedure, the aqueous dispersion of adduct of phleomycin and deoxyribonucleic acid is diluted with approximately equal volume of 2-molar (or stronger, without harm, if desired) sodium chloride or potassium chloride solution or a mixture of them. The highly concentrated ionic species serve to free the antibiotic from its lodging as a copolymer at some of the phleomere sites of the deoxyribonucleic acid chain. The resulting solution, after a short interval, such as 15 minutes, for reaction to be completed, is then again separated by gel filtration, using, with good results, Sephadex G-25, which detains the phleomycin and the ionic species, but passes the deoxyribonucleic acid promptly. This prompt eluate can be discarded, or is held for recovery of the deoxyribonucleic acid if desired. It contains no significant amounts of the antibiotic.

The gel-filtration column is then further washed, to recover, as tardy eluate, the antibiotic. It is preferred to wash with wash water of the same ionic content as the antibiotic solution, to avoid awkward upset of the ionic content of the column at this juncture, but water can be used. When using salt water, as preferred, the antibiotic is eluted in salt solution.

The solution of salt and antibiotic is then again filtered by gel filtration, such as with Sephadex G-10, the smaller pores of which quickly pass the antibiotic but detain the ionic species. Removal of the salt should be complete as indicated by an appropriate qualitative test for chloride. The familiar silver nitrate test is satisfactory. Water is then removed by low-temperature vacuum evaporation, to obtain the antibiotic, pure and dry.

Actual amounts vary in differing preparations but from the original five liters of *E. coli* culture treated at optical half-extinction population density with 100 grams crude antibiotic, one obtains, at this juncture, on the order of 30 to 40 milligrams of antibiotic from its complex with on the order of 10 grams deoxyribonucleic acid.

The separation of usable deoxyribonucleic acid, with salt, in water, was noted. To separate this substance as a product, it need only be passed through a column of small-pore gel-filtration medium such as Sephadex G-10. The deoxyribonucleic acid is in the prompt eluate and it has not been deemed economical to attempt to recover the salt. By low-temperature vacuum evaporation, water is substantially reduced in quantity, and ethanol is added. The deoxyribonucleic acid precipitates in the form of its familiar fibers, and is spooled out; can be washed with further ethanol and handled, from this point forward as desired, for example, dried and stored.

This specification is based upon replicate performance of each of the steps, and of the entire process, of each of the methods; and presents the best modes at each juncture, together with, in some instances, very satisfactory alternate procedures that have not been regarded as the best mode.

Note is taken of the fact that the instant *in vivo* process provides a highly efficient course for the elaboration of deoxyribonucleic acid from any source. When used to purify phleomycin, the substance is elaborated as its phleomycin adduct; when only the deoxyribonucleic acid is desired, it is readily elaborated in pure form.

When unbound deoxyribonucleic acid is desired, preparing it by the method of this invention, it is sometimes, especially in the instance of vegetable matter, preferred to take the fresh substance and slowly freeze it. The transition from liquid to solid, of aqueous substances, should be so conducted as to yield the growth of ice crystals of relatively large size; their function is to penetrate the tough cellulose walls of the vegetable matter (or other polysaccharide in the instance of fungal cells) to facilitate easy elution of water-mobilized contents. With reference to vegetable matter particularly, such as algae, after freezing, the matter is thawed and the thawing can take place while carrying out an acetone wash. The substance is washed well with acetone to remove cell-wall lipid substances. Filtration is then carried out in conventional manner to remove acetone solution of vegetable lipids. These lipids can be recovered from the acetone when there is a desire to have them. The residue, modified vegetable cells substantially freed of lipids, is then resuspended in water and is then treated with *Pronase* to digest and reduce particle size of proteinaceous materials present, using *Pronase* in the amount of approximately 10 milligrams per liter and the resulting mixture is stirred for 15 minutes further. Then, to the resulting mixture is added an equal volume of saturated (about 90 weight percent) aqueous phenol at room temperature and the mixture stirred 10 to 15 minutes further.

The phenol has a strong precipitating action upon protein substances that are present. During stirring the viscosity of the mixture increases, and it assumes the appearance of a milky emulsion.

The emulsion is centrifuged, and yields an aqueous and a phenolic phase separated, typically, by an opalescent interphase. The aqueous phase, containing the deoxyribonucleic acid, is collected.

The phenolic phase oftentimes contains small amounts of deoxyribonucleic acid. It may be inefficient to try to recover these amounts, but it is not difficult. To effect such recovery one adds, successively, portions of diethyl ether and shakes or stirs thoroughly. The volume of an ether portion is not critical and about half the volume of phenolic phase is a satisfactory volume. The number of portions is not critical but one or two give good results and beyond five further recovery is negligible. The ether extract portions are separated from the phenolic, combined, ether is vaporized and removed. The resulting product, if any, is combined with the main product derived from the aqueous phase: it can efficiently be added to the aqueous phase.

To the aqueous phase, then, methanol is added to precipitate deoxyribonucleic acid, until further methanol elicits no further precipitate: this concentration represents about 60 to 70 percent methanol: the addition of excess methanol at this point is not harmful.

The fibrous, precipitated deoxyribonucleic acid is then spooled on a stirring rod or the like, and collected. It is now washed in flowing methanol or in several changes of still ethanol.

The frozen and thawed vegetable cells, after acetone wash to remove lipids, can also be treated with aqueous phleomycin, whereupon there forms an adduct of phleomycin with deoxyribonucleic acid of vegetable origin. When this is done, there is removed from the cells the adduct of deoxyribonucleic acid and phleomycin. It is then treated as hereinbefore described, to obtain the pure phleomycin.

While phleomycin has been discussed herein as exemplary of antibiotics that bond to form an adduct of deoxyribonucleic acid and can be purified by employing that property, it is apparent to skilled biochemists, in light of the present invention, that the same techniques with only noninventive, range-finding adaptations are available also to purify other such adduct-forming antibiotics, such as Actinomycin D and bleomycin.

I claim:

1. Process for producing deoxyribonucleic acid which comprises in the stated sequence the steps of culturing cells in a liquid culture medium, adding an antibiotic that is characterized by the fact that it bonds with deoxyribonucleic acid to form an adduct, separating cells from liquid culture, resuspending and lysing said cells in a lysozyme-lysing solution, adding *Pronase* and further lysing, adding phenol, centrifuging and recovering aqueous phase, adding methanol, precipitating and recovering solids, resuspending said solids in an RNAase-lysing solution, gel-filtering of the lysed solution, recovering the prompt eluate, adding a monovalent, ionic metal salt to at least about 0.7 molar concentration, again gel-filtering and recovering prompt eluate, and evaporating and removing water.